(12) United States Patent
Turney

(10) Patent No.: US 11,255,268 B2
(45) Date of Patent: Feb. 22, 2022

(54) INTERCOOLED COOLING AIR WITH SELECTIVE PRESSURE DUMP

(71) Applicant: United Technologies Corporation, Farmington, CT (US)

(72) Inventor: Joseph Turney, Amston, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 307 days.

(21) Appl. No.: 16/050,409

(22) Filed: Jul. 31, 2018

(65) Prior Publication Data

US 2020/0040820 A1 Feb. 6, 2020

(51) Int. Cl.
*F02C 7/18* (2006.01)
*F02C 9/18* (2006.01)
(Continued)

(52) U.S. Cl.
CPC ............... *F02C 7/185* (2013.01); *F02C 7/32* (2013.01); *F02C 9/18* (2013.01); *F02K 3/06* (2013.01);
(Continued)

(58) Field of Classification Search
CPC ........... F05D 2220/32; F05D 2260/213; F05D 2270/101; F02C 6/08; F02C 7/185;
(Continued)

(56) References Cited

U.S. PATENT DOCUMENTS 2,692,476 A 10/1954 Schaal et al.
3,878,677 A 4/1975 Colvin
(Continued)

FOREIGN PATENT DOCUMENTS

DE 2852057 6/1979
EP 0447886 9/1991
(Continued)

OTHER PUBLICATIONS

Dornheim, Michael A., Rolls-Royce Trent 1000 to Drive Boeing 787 Accessories From IP Spool, Aviation Week & Space Technology, Mar. 28, 2005, p. 51, Los Angeles, CA.
(Continued)

*Primary Examiner* — Alain Chau
*Assistant Examiner* — Sean V Meiller
(74) *Attorney, Agent, or Firm* — Carlson, Gaskey & Olds, P.C.

(57) ABSTRACT

A gas turbine engine includes a main compressor section having a downstream most location, and a turbine section, with both the main compressor section and the turbine section housing rotatable components. A first tap taps air compressed by the main compressor section at an upstream location upstream of the downstream most location. The first tap passes through a heat exchanger, and to a cooling compressor. Air downstream of the cooling compressor is selectively connected to reach at least one of the rotatable components. The cooling compressor is connected to rotate at a speed proportional to a rotational speed in one of the main compressor section and the turbine section. A valve system includes a check valve for selectively blocking flow downstream of the cooling compressor from reaching the at least one rotatable component. A dump valve selectively dumps air downstream of the cooling compressor. A method is also disclosed.

12 Claims, 2 Drawing Sheets

(51) Int. Cl.
  *F02C 6/08*   (2006.01)
  *F02C 7/32*   (2006.01)
  *F02K 3/06*   (2006.01)
  *F16K 15/14*  (2006.01)

(52) U.S. Cl.
  CPC ........ *F16K 15/147* (2013.01); *F05D 2220/32* (2013.01); *F05D 2260/213* (2013.01); *F05D 2260/4031* (2013.01)

(58) Field of Classification Search
  CPC ...... F02C 7/32; F02C 9/18; F02K 3/06; F16K 15/147
  See application file for complete search history.

(56) References Cited

U.S. PATENT DOCUMENTS

| | | | |
|---|---|---|---|
| 4,254,618 A | 3/1981 | Elovic | |
| 4,539,945 A | 9/1985 | Bosisio | |
| 4,882,902 A | 11/1989 | Reigel et al. | |
| 5,056,335 A | 10/1991 | Renninger et al. | |
| 5,269,135 A | 12/1993 | Vermejan et al. | |
| 5,305,616 A | 4/1994 | Coffinberry | |
| 5,317,877 A | 6/1994 | Stuart | |
| 5,392,614 A | 2/1995 | Coffinberry | |
| 5,414,992 A | 5/1995 | Glickstein | |
| 5,452,573 A | 9/1995 | Glickstein et al. | |
| 5,498,126 A | 3/1996 | Pighetti et al. | |
| 5,724,806 A | 3/1998 | Horner | |
| 5,758,485 A | 6/1998 | Frutschi | |
| 5,867,979 A | 2/1999 | Newton et al. | |
| 5,918,458 A | 7/1999 | Coffinberry et al. | |
| 6,050,079 A | 4/2000 | Durgin et al. | |
| 6,065,282 A | 5/2000 | Fukue et al. | |
| 6,134,880 A | 10/2000 | Yoshinaka | |
| 6,253,554 B1* | 7/2001 | Kobayashi | F02C 7/12 |
| | | | 60/736 |
| 6,430,931 B1 | 8/2002 | Horner | |
| 6,487,863 B1 | 12/2002 | Chen et al. | |
| 6,612,114 B1 | 9/2003 | Klingels | |
| 6,892,523 B2 | 5/2005 | Fetescu et al. | |
| 7,237,386 B2 | 7/2007 | Hoffmann et al. | |
| 7,246,484 B2 | 7/2007 | Giffin, III et al. | |
| 7,284,377 B2 | 10/2007 | Joshi et al. | |
| 7,306,424 B2 | 12/2007 | Romanov et al. | |
| 7,334,412 B2 | 2/2008 | Tiemann | |
| 7,347,637 B2 | 3/2008 | Kubo et al. | |
| 7,500,365 B2 | 3/2009 | Suciu et al. | |
| 7,552,591 B2 | 6/2009 | Bart et al. | |
| 7,698,884 B2 | 4/2010 | Maguire et al. | |
| 7,765,788 B2 | 8/2010 | Schwarz | |
| 7,823,389 B2 | 11/2010 | Seitzer et al. | |
| 7,882,691 B2 | 2/2011 | Lemmers, Jr. et al. | |
| 7,886,520 B2 | 2/2011 | Stretton et al. | |
| 8,015,828 B2 | 9/2011 | Moniz et al. | |
| 8,037,686 B2 | 10/2011 | Lasker | |
| 8,087,249 B2 | 1/2012 | Ottaviano et al. | |
| 8,181,443 B2 | 5/2012 | Rago | |
| 8,307,626 B2* | 11/2012 | Sheridan | F01D 25/20 |
| | | | 184/26 |
| 8,307,662 B2 | 11/2012 | Turco | |
| 8,350,398 B2 | 1/2013 | Butt | |
| 8,397,487 B2 | 3/2013 | Sennoun et al. | |
| 8,402,742 B2 | 3/2013 | Roberge et al. | |
| 8,434,997 B2 | 5/2013 | Pinero et al. | |
| 8,511,967 B2 | 8/2013 | Suciu et al. | |
| 8,522,529 B2 | 9/2013 | Martinou et al. | |
| 8,572,982 B2 | 11/2013 | Tiemann | |
| 8,602,717 B2 | 12/2013 | Suciu et al. | |
| 8,621,871 B2 | 1/2014 | McCune et al. | |
| 8,727,703 B2 | 5/2014 | Laurello et al. | |
| 8,776,952 B2 | 7/2014 | Schwarz et al. | |
| 8,814,502 B2 | 8/2014 | Eleftheriou | |
| 8,876,465 B2 | 11/2014 | Stretton | |
| 8,961,108 B2 | 2/2015 | Bergman et al. | |
| 9,234,481 B2 | 1/2016 | Suciu et al. | |
| 9,243,563 B2 | 1/2016 | Lo | |
| 9,255,492 B2 | 2/2016 | Bacic | |
| 9,297,391 B2 | 3/2016 | Rued et al. | |
| 9,422,063 B2 | 8/2016 | Diaz | |
| 9,429,072 B2 | 8/2016 | Diaz et al. | |
| 9,856,793 B2 | 1/2018 | Zelesky et al. | |
| 10,054,051 B2* | 8/2018 | Foutch | F02K 3/02 |
| 2001/0022087 A1 | 9/2001 | Kobayashi et al. | |
| 2003/0046938 A1 | 3/2003 | Mortzheim et al. | |
| 2004/0088995 A1 | 5/2004 | Reissig | |
| 2005/0172612 A1 | 8/2005 | Yamanaka et al. | |
| 2007/0022735 A1 | 2/2007 | Henry et al. | |
| 2007/0213917 A1 | 9/2007 | Bruno et al. | |
| 2007/0245738 A1 | 10/2007 | Stretton et al. | |
| 2008/0028763 A1 | 2/2008 | Schwarz et al. | |
| 2008/0230651 A1 | 9/2008 | Porte | |
| 2008/0253881 A1 | 10/2008 | Richards | |
| 2009/0007567 A1 | 1/2009 | Porte et al. | |
| 2009/0090096 A1 | 4/2009 | Sheridan | |
| 2009/0145102 A1 | 6/2009 | Roberge et al. | |
| 2009/0196736 A1 | 8/2009 | Sengar et al. | |
| 2009/0226297 A1 | 9/2009 | Yanagi et al. | |
| 2009/0272120 A1 | 11/2009 | Tiemann | |
| 2010/0043396 A1 | 2/2010 | Coffinberry | |
| 2010/0154434 A1 | 6/2010 | Kubota et al. | |
| 2011/0036066 A1 | 2/2011 | Zhang et al. | |
| 2011/0088405 A1 | 4/2011 | Turco | |
| 2011/0120083 A1 | 5/2011 | Giffin et al. | |
| 2011/0247344 A1 | 10/2011 | Glahn et al. | |
| 2012/0067055 A1 | 3/2012 | Held | |
| 2012/0102915 A1 | 5/2012 | Baltas | |
| 2012/0159961 A1 | 6/2012 | Krautheim et al. | |
| 2012/0180509 A1 | 7/2012 | DeFrancesco | |
| 2013/0036747 A1 | 2/2013 | Fuchs et al. | |
| 2013/0067928 A1 | 3/2013 | Chao et al. | |
| 2013/0098059 A1 | 4/2013 | Suciu et al. | |
| 2013/0145744 A1 | 6/2013 | Lo et al. | |
| 2013/0145774 A1 | 6/2013 | Duong et al. | |
| 2013/0186102 A1 | 7/2013 | Lo | |
| 2013/0199156 A1 | 8/2013 | Ress, Jr. et al. | |
| 2013/0239583 A1 | 9/2013 | Suciu et al. | |
| 2013/0319002 A1 | 12/2013 | Sidelkovskiy et al. | |
| 2014/0020506 A1 | 1/2014 | Duong | |
| 2014/0137417 A1 | 5/2014 | Silberberg et al. | |
| 2014/0196469 A1 | 7/2014 | Finney et al. | |
| 2014/0230444 A1 | 8/2014 | Hao et al. | |
| 2014/0250898 A1 | 9/2014 | Mackin et al. | |
| 2014/0260326 A1 | 9/2014 | Schwarz et al. | |
| 2014/0311157 A1 | 10/2014 | Laurello et al. | |
| 2014/0341704 A1 | 11/2014 | Fletcher | |
| 2014/0352315 A1 | 12/2014 | Diaz | |
| 2015/0114611 A1 | 4/2015 | Morris et al. | |
| 2015/0275758 A1* | 10/2015 | Foutch | F02C 7/047 |
| | | | 60/779 |
| 2015/0275769 A1 | 10/2015 | Foutch et al. | |
| 2015/0285147 A1 | 10/2015 | Phillips et al. | |
| 2015/0308339 A1 | 10/2015 | Forcier | |
| 2015/0330236 A1 | 11/2015 | Beecroft et al. | |
| 2015/0354465 A1 | 12/2015 | Suciu et al. | |
| 2015/0354822 A1 | 12/2015 | Suciu et al. | |
| 2016/0009399 A1 | 1/2016 | Schwarz et al. | |
| 2016/0010554 A1 | 1/2016 | Suciu et al. | |
| 2016/0131036 A1 | 5/2016 | Bintz et al. | |
| 2016/0131037 A1 | 5/2016 | Spangler et al. | |
| 2016/0169118 A1 | 6/2016 | Duong | |
| 2016/0215732 A1 | 7/2016 | Malecki | |
| 2016/0237906 A1 | 8/2016 | Suciu et al. | |
| 2016/0312797 A1 | 10/2016 | Suciu et al. | |
| 2016/0341125 A1 | 11/2016 | Kraft et al. | |
| 2016/0369697 A1 | 12/2016 | Schwarz et al. | |
| 2017/0009657 A1 | 1/2017 | Schwarz et al. | |
| 2017/0044980 A1 | 2/2017 | Duesler et al. | |
| 2017/0044982 A1 | 2/2017 | Duesler et al. | |
| 2017/0106985 A1* | 4/2017 | Stieger | H02K 7/1823 |
| 2017/0152765 A1 | 6/2017 | Uechi et al. | |
| 2017/0159568 A1 | 6/2017 | Sennoun et al. | |
| 2017/0167388 A1 | 6/2017 | Merry et al. | |
| 2017/0175632 A1 | 6/2017 | Hanrahan et al. | |

(56) References Cited

U.S. PATENT DOCUMENTS

| | | | |
|---|---|---|---|
| 2017/0184027 A1* | 6/2017 | Moniz | F02K 3/06 |
| 2017/0204787 A1 | 7/2017 | Duesler et al. | |
| 2018/0156121 A1* | 6/2018 | Snape | F04D 27/002 |

FOREIGN PATENT DOCUMENTS

| | | |
|---|---|---|
| EP | 0469825 | 2/1992 |
| EP | 0608142 | 7/1994 |
| EP | 0903484 | 3/1999 |
| EP | 1314872 | 5/2003 |
| EP | 1944475 | 7/2008 |
| EP | 2085599 | 8/2009 |
| EP | 2128023 | 12/2009 |
| EP | 2362081 | 8/2011 |
| EP | 2540991 | 1/2013 |
| EP | 2584172 | 4/2013 |
| EP | 2604825 | 6/2013 |
| EP | 2733322 | 5/2014 |
| EP | 2865981 | 4/2015 |
| EP | 2942490 | 11/2015 |
| EP | 3085923 | 10/2016 |
| EP | 3085924 | 10/2016 |
| EP | 3121411 | 1/2017 |
| FR | 2851295 | 8/2004 |
| GB | 1244340 | 8/1971 |
| GB | 2152148 | 7/1985 |
| JP | H1136889 | 2/1999 |
| WO | 2003037715 | 5/2003 |
| WO | 2008082335 | 7/2008 |
| WO | 2013154631 | 10/2013 |
| WO | 2014046713 | 3/2014 |
| WO | 2014092777 | 6/2014 |
| WO | 2014120125 | 8/2014 |

OTHER PUBLICATIONS

U.S. Appl. No. 15/232,101.
U.S. Appl. No. 14/964,984.
U.S. Appl. No. 14/967,446.
U.S. Appl. No. 15/069,197.
U.S. Appl. No. 15/269,014.
U.S. Appl. No. 15/373,072.
European Search Report for European Application No. 16166707.6 dated Sep. 26, 2016.
European Search Report for European Application No. 16166724.1 dated Sep. 26, 2016.
European Search Report for European Patent Application No. 16154635.3 dated Jul. 6, 2016.
European Search Report for European Application No. 16155316.9 completed Jun. 30, 2016.
European Search Report for Application No. 16170021.6 dated Oct. 11, 2016.
European Search Report for Application No. 16174862.9 dated Nov. 7, 2 016.
European Search Report for European Application No. 16175531.9 dated Nov. 15, 2016.
European Search Report for European Application No. 16175533.5 dated Nov. 15, 2016.
European Search Report for European Application No. 16175552.5 dated Nov. 17, 2016.
European Search Report for European Application No. 16175760.4 dated Nov. 16, 2016.
European Search Report for Application No. 16178207.3 dated Nov. 21, 2016.
European Search Report for European Application No. 16202876.5 dated Apr. 24, 2017.
European Search Report for European Application No. 16180657.5 dated Dec. 16, 2016.
European Search Report for EP Application No. 17160816.9 dated Jul. 21, 2017.
European Search Report for EP Application No. 19189477.3 dated Dec. 20, 2019.

\* cited by examiner

INTERCOOLED COOLING AIR WITH SELECTIVE PRESSURE DUMP

BACKGROUND

This application relates to a control for selectively dumping air downstream of a cooling compressor in an intercooled cooling air system.

Gas turbine engines are known and typically include a fan delivering air into a bypass duct as propulsion air. Air is also delivered into a compressor where it is mixed with fuel and ignited. Products of this combustion pass downstream over turbine rotors, driving them to rotate.

It is known to provide cooling air to several areas within the gas turbine engine. As examples, the downstream portions of the compressor section and the more upstream portions of the turbine section experience high heat loads. Thus, it is known to provide cooling air.

Gas turbine engines have historically driven a low pressure compressor and a fan at a common speed with a single turbine. More recently, it has been proposed to incorporate a gear reduction between the low pressure compressor and the fan. This allows an increase in a bypass ratio, where the portion of air delivered into the bypass duct is propulsion air compared to the air delivered into the compressor. With such a change, the air being delivered into the compressor must be utilized efficiently.

In addition, the overall efficiency of all types of gas turbine engines is becoming an increasingly important matter of design. Fuel prices are rising and, thus, any efficiency improvement is important.

SUMMARY

In a featured embodiment, a gas turbine engine includes a main compressor section having a downstream most location, and a turbine section, with both the main compressor section and the turbine section housing rotatable components. A first tap taps air compressed by the main compressor section at an upstream location upstream of the downstream most location. The first tap passes through a heat exchanger, and to a cooling compressor. Air downstream of the cooling compressor is selectively connected to reach at least one of the rotatable components. The cooling compressor is connected to rotate at a speed proportional to a rotational speed in one of the main compressor section and the turbine section. A valve system includes a check valve for selectively blocking flow downstream of the cooling compressor from reaching the at least one rotatable component. A dump valve selectively dumps air downstream of the cooling compressor.

In another embodiment according to the previous embodiment, the heat exchanger is positioned in a bypass duct, and a fan delivers air into the bypass duct and into the main compressor section.

In another embodiment according to any of the previous embodiments, the cooling compressor is driven by a shaft which rotates with a high pressure turbine.

In another embodiment according to any of the previous embodiments, a take-off shaft is connected to be driven by the shaft and, in turn connected to drive the cooling compressor.

In another embodiment according to any of the previous embodiments, the take-off shaft is connected to drive the cooling compressor through a gearbox.

In another embodiment according to any of the previous embodiments, a second tap is located downstream of the upstream location, and is connected to selectively deliver air to cool the at least one of the rotatable components at least when the check valve blocks flow downstream of the cooling compressor.

In another embodiment according to any of the previous embodiments, the dump valve and the check valve move as a single valve.

In another embodiment according to any of the previous embodiments, the check valve is driven by a pressure downstream of the cooling compressor to allow flow to reach the at least one of the rotatable components when a pressure downstream of the cooling compressor is above a predetermined limit greater than the pressure at the second tap location, and block flow when the pressure downstream of the cooling compressor is below the predetermined limit, and the check valve is connected to a moving valve which selectively opens or blocks communication to dump the air.

In another embodiment according to any of the previous embodiments, the upstream location is in a high pressure compressor.

In another embodiment according to any of the previous embodiments, a second tap is located downstream of the upstream location, and is connected to selectively deliver air to cool the at least one of the rotatable components at least when the check valve blocks flow downstream of the cooling compressor.

In another embodiment according to any of the previous embodiments, the dump valve and the check valve move as a single valve.

In another embodiment according to any of the previous embodiments, the check valve is driven by a pressure downstream of the cooling compressor to allow flow to reach the at least one of the rotatable components when a pressure downstream of the cooling compressor is above a predetermined limit greater than the pressure at the second tap location, and block flow when the pressure downstream of the cooling compressor is below the predetermined limit, and the check valve is connected to a moving valve which selectively opens or blocks communication to dump the air.

In another embodiment according to any of the previous embodiments, dumped air is used to increase air flow across an auxiliary heat exchanger.

In another featured embodiment, a gas turbine engine includes a main compressor section having a downstream most location, and a turbine section, with both the main compressor section and the turbine section housing rotatable components. There is a means for tapping air compressed by the main compressor section at a location upstream of the downstream most location, and cooling the tapped air before passing it to a cooling compressor and selectively connecting the tapped air to reach at least one of the rotatable components. The cooling compressor is connected to rotate at a speed proportional to a rotational speed in one of the main compressor section and the turbine section. There is a means for selectively blocking flow downstream of the cooling compressor from reaching the at least one rotatable component, and selectively dumping air downstream of the cooling compressor.

In another embodiment according to the previous embodiment, the cooling compressor is connected to be driven by a shaft which rotates with a high pressure turbine.

In another embodiment according to any of the previous embodiments, the means for tapping includes a first tap at a location in a high pressure compressor.

In another embodiment according to any of the previous embodiments, a second tap is located downstream of the upstream location, and is connected for selectively deliver air to cool the at least one of the rotatable components at least when the means for selectively blocking blocks flow downstream of the cooling compressor.

In another embodiment according to any of the previous embodiments, means for selectively blocking includes a dump valve and a check valve which move as a single valve.

In another embodiment according to any of the previous embodiments, the dump valve and the check valve move as a single valve.

In another featured embodiment, a method of operating a gas turbine engine includes driving a main compressor section having a downstream most location, and driving a turbine section, with both the main compressor section and the turbine section housing rotatable components. Tapping air is compressed by the main compressor section at a location upstream of the downstream most location, and passes the tapped air through a heat exchanger, and to a cooling compressor. Air downstream of the cooling compressor is selectively connected to reach at least one of the rotatable components. The cooling compressor is driven to rotate at a speed proportional to a rotational speed in one of the main compressor section and the turbine section. The method selectively blocking flow downstream of the cooling compressor from reaching the at least one rotatable component, and selectively dumps air downstream of the cooling compressor.

These and other features may be best understood from the following drawings and specification.

DETAILED DESCRIPTION

Figure 1:
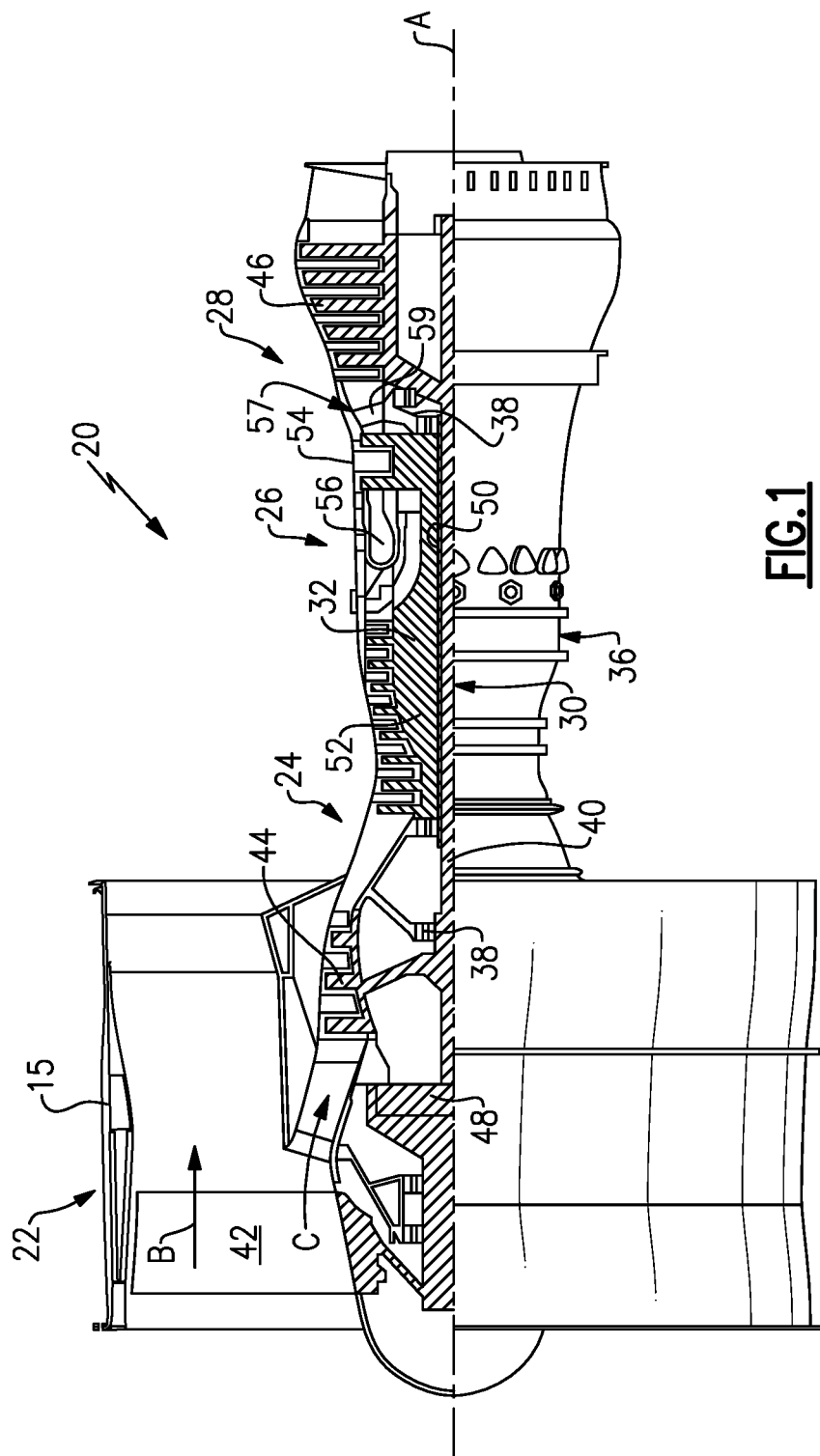
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of

[(Tram °R)/(518.7°R)]$^{0.5}$. The "Low corrected fan tip speed" as disclosed herein according to one non-limiting embodiment is less than about 1150 ft/second (350.5 meters/second).

Figure 2:
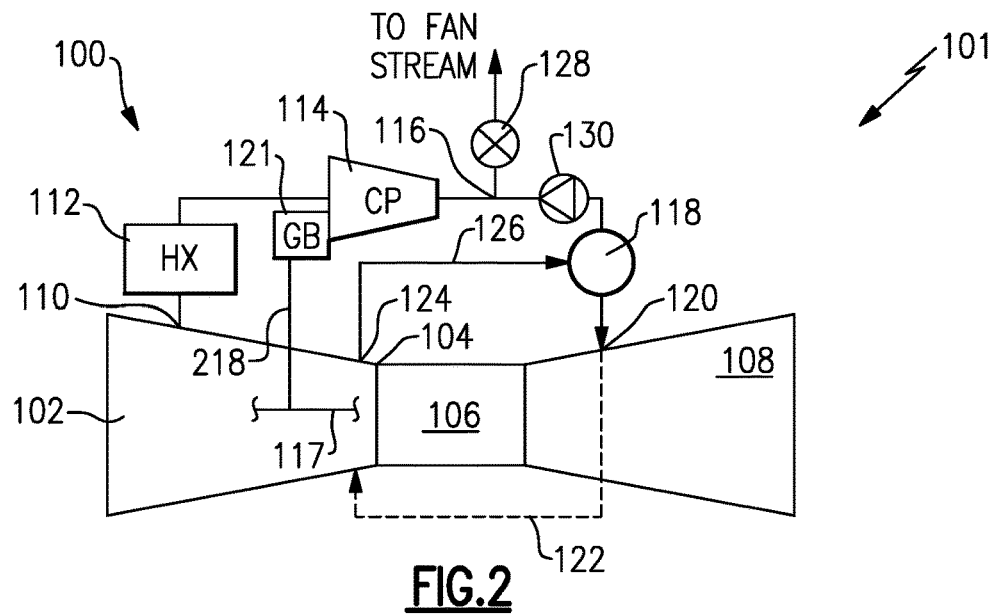
FIG. 2 schematically shows a cooling air system.

FIG. 2 shows an intercooled cooling system 100 for delivering cooling air to rotating components within an engine 101.

The engine 101 includes a main compressor section 102 having a downstream most location 104. A combustor 106 is downstream of a main compressor section 102 and a turbine section 108 is downstream of a combustor 106.

Air is shown being tapped at a location 110 which is upstream of the downstream most location 104. By selectively tapping air at this "less compressed" location, less work is utilized to achieve the air being tapped. The air may be tapped in an upstream portion of a high pressure compressor or even in a low pressure compressor section. Air from the tap 110 passes through a heat exchanger 112. The heat exchanger 112 may be placed in a bypass duct, such as the bypass duct shown in FIG. 1.

Downstream of the heat exchanger 112, the air passes through a cooling compressor 114. Cooling compressor 114 may be a centrifugal compressor. As shown schematically, a shaft 117, which may be driven as part of the high pressure spool (see FIG. 1), drives a take-off shaft 218. Shaft 218 drives a rotor, or impeller, of the centrifugal compressor 114 through a gearbox 121.

Air downstream of compressor 114 communicates to line 116, and then through a mixing chamber 118 into the turbine section 108, as shown at point 120. It should be understood that this is a schematic representation. In fact, the air may often move into the core engine through a downstream vane or strut approximately at the downstream most location 104, and then move radially inwardly of the combustor to reach upstream portions of the turbine section 108. As shown in phantom at line 122, the cooling air can also be delivered to the downstream portions of the compressor section 102.

For purposes of this application, the compressor and turbine sections could be said to have rotatable components and the cooling air is supplied to at least one of the rotating components in the compressor and/or turbine sections 102 and 108.

At times, it may be undesirable to supply air from the tap 110 to the cooling location 120. Thus, a second tap 124, which may be closer to the downstream most location 104, and could even be downstream of the downstream most location 104, is communicated through line 126 to the mixing chamber 118.

The times when it may be less desirable to tap from the location 110 may be lower power operation of the engine 101. Since the compressor 114 is driven at a speed directly proportional to the speed of shaft 117, as the engine moves to slower speed operation, the compressor 114 will also move to slower operation. At such times, a pressure ratio across the compressor may increase such that the compressor may see undesirable operation. As an example, the pressure ratio may approach, and even pass, a surge line, which would be undesirable. Thus, during lower power operation, the air at line 116 may pass through a dump valve 128 and be dumped into an exhaust stream, or into the bypass flow. At the same time, a check valve 130 may block communication downstream of the compressor 114 from reaching the mixing chamber 118 and the inlet 120 to the core engine. At such times, the air from line 126 may pass to provide cooling air.

Figures 3A, 3B:
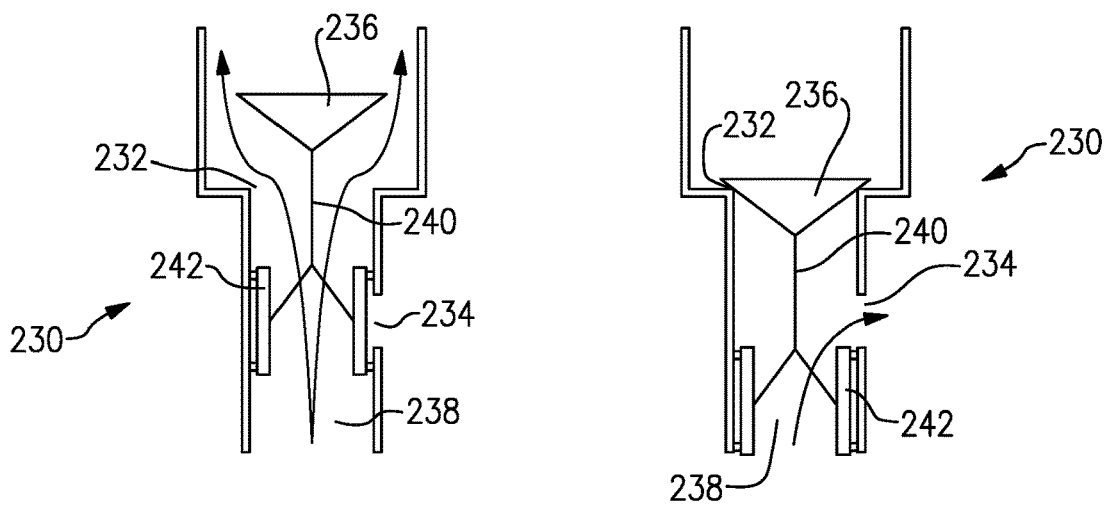
FIG. 3A shows a valve arrangement in a first position.
FIG. 3B shows the FIG. 3A valve in a second position.

FIG. 3A shows a first embodiment of a valve which may provide the function of both valves 128 and 130. The combined valve 230, as shown in FIG. 3A, is shown in a first higher power position at which air is allowed to move through a check valve portion 236, which is removed from a seat 232, such that air can pass to the mixing chamber 118 from a cooling compressor 114. When the air downstream of the cooling compressor 114 is above a predetermined pressure, the valve will be in the FIG. 3A position. More accurately, the valve is open (in the FIG. 3A position) when a pressure difference between lines 116 and 118 exceeds a predetermined level.

As shown, a connection 240 connects the check valve 236 to a dump valve 242, which is shown selectively blocking a vent 234. Pressure in the connection 238, which is downstream of the cooling compressor 114, will maintain the valves 236 and 242 in this position during higher power operation.

Compressor 114 is designed such that the pressure at line 116 is greater than that at line 126. Thus, air will flow to 120 from line 116. In other embodiments air may flow from both lines for cooling purposes in the FIG. 3A position, and only line 126 in the FIG. 3B position.

As an example, the FIG. 3A operation may occur during take-off and other high power operation. However, when the pressure on line 238 decreases, such as would occur, for example, at cruise condition, the valve 234 seats against the seat 232. The connection 240 move the valve such that the vent 234 is opened and air may pass into the bypass duct or otherwise pass into an exhaust stream.

It could be said that the valve combination 230 operates automatically based upon the pressure downstream of the cooling compressor 114 to selectively block flow to the cooling location, while at the same time dumping flow downstream of the cooling compressor.

The check valve is also there to limit or prevent backflow from chamber 118 reaching line 116.

The FIG. 3B operation might occur, for example, at idle or descent conditions.

Figure 4:
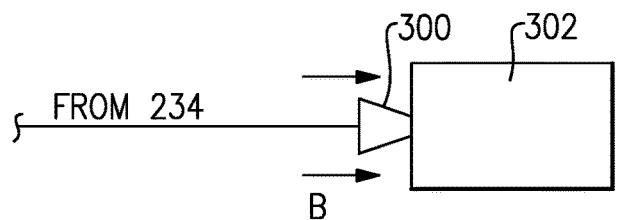
FIG. 4 shows an optional feature.

FIG. 4 shows an optional feature that may use the "dumped" air. Air downstream of valve 234 may pass through an ejector 300 to draw additional bypass air B across a heat exchanger 302. The ejector 300 may also be positioned downstream of heat exchanger 302. Heat exchanger 302 could be cooling any number of fluids associated with the engine.

For purposes of this application this FIG. 4 use, and other uses, are still interpreted as "dumped."

A gas turbine engine could be said to have a main compressor section having a downstream most location, and a turbine section. The main compressor section and the turbine section both housing rotatable components. There is a means for tapping air compressed by the main compressor section at a location upstream of the downstream most location. The means cools the tapped air before passing it to a cooling compressor and selectively connecting to the tapped air reach at least one of the rotatable components.

The cooling compressor in the means for tapping is connected to rotate at a speed proportional to a rotational speed in one of the main compressor section and the turbine section. There is also a means for selectively blocking flow downstream of the cooling compressor from reaching the at least one rotatable component, and selectively dumping air downstream of the cooling compressor.

The means for tapping includes a first tap at a location in a high pressure compressor. The means for selectively blocking includes a dump valve and a check valve which move as a single valve.

A method of operating a gas turbine engine could be said to include the steps of driving a main compressor section having a downstream most location, and driving a turbine section, with both the main compressor section and the turbine section housing rotatable components. Tapped air is compressed by the main compressor section at a location upstream of the downstream most location. The tapped air is passed through a heat exchanger, and to a cooling compressor. Air downstream of the cooling compressor is selectively connected to reach at least one of the rotatable components. The cooling compressor is driven to rotate at a speed proportional to a rotational speed in one of the main compressor section and the turbine section. The method selectively dumps air downstream of the cooling compressor and at the same time blocks flow downstream of the cooling compressor.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
   a main compressor section having a downstream most location, and a turbine section, with both said main compressor section and said turbine section housing rotatable components;
   a first tap for tapping air compressed by said main compressor section at an upstream location upstream of said downstream most location, and said first tap passing through a heat exchanger, and to a cooling compressor, air downstream of said cooling compressor being selectively connected to reach at least one of said rotatable components, and said cooling compressor being connected to rotate at a speed proportional to a rotational speed in one of said main compressor section and said turbine section;
   a valve system including a check valve for selectively blocking flow downstream of said cooling compressor from reaching said at least one rotatable component, and a dump valve for selectively dumping air downstream of said cooling compressor;
   wherein a second tap is located downstream of said upstream location, and is connected to selectively deliver air to cool said at least one of said rotatable components at least when said check valve blocks flow downstream of said cooling compressor;
   wherein said dump valve and said check valve move as a single valve;
   wherein said check valve is driven by a pressure downstream of said cooling compressor to allow flow to reach said at least one of said rotatable components when a pressure downstream of said cooling compressor is above a predetermined limit greater than the pressure at the second tap location, and blow flow when said pressure downstream of said cooling compressor is below said determined limit, and said check valve being connected to said dump valve which selectively opens or blocks communication to dump said air; and
   said at least one of said rotatable components being in said turbine section, and said dump valve acting to dump air downstream of said cooling compressor, but upstream of said turbine section such that air dumped by said dump valve does not reach said at least one of said rotatable components in said turbine section.

2. The gas turbine engine as set forth in claim 1, wherein said cooling compressor is driven by a shaft which rotates with a high pressure turbine.

3. The gas turbine engine as set forth in claim 2, wherein a take-off shaft is connected to be driven by said shaft and, in turn connected to drive said cooling compressor.

4. The gas turbine engine as set forth in claim 3, wherein said take-off shaft is connected to drive said cooling compressor through a gearbox.

5. The gas turbine engine as set forth in claim 1, wherein said upstream location is in a high pressure compressor.

6. The gas turbine engine as set forth in claim 1, wherein dumped air is used to increase air flow across an auxiliary heat exchanger.

7. The gas turbine engine as set forth in claim 1, wherein at lower power operation of the gas turbine engine said check valve blocking flow, and said dump valve dumping air downstream of said cooling compressor, and at higher power operation of said gas turbine engine said check valve allowing flow downstream of said cooling compressor to reach said at least one rotatable component, and said dump valve not dumping air downstream of said cooling compressor.

8. The gas turbine engine as set forth in claim 7, wherein said higher power operation including take-off of an aircraft associated with said gas turbine engine, and said lower power operation including at least idle of said gas turbine engine.

9. A gas turbine engine comprising:
   a main compressor section having a downstream most location, and a turbine section, with both said main compressor section and said turbine section housing rotatable components;
   a first tap for tapping air compressed by said main compressor section at an upstream location upstream of said downstream most location, and said first tap passing through a heat exchanger, and to a cooling compressor, air downstream of said cooling compressor being selectively connected to reach at least one of said rotatable components, and said cooling compressor being connected to rotate at a speed proportional to a rotational speed in one of said main compressor section and said turbine section;
   a valve system including a check valve for selectively blocking flow downstream of said cooling compressor from reaching said at least one rotatable component, and a dump valve for selectively dumping air downstream of said cooling compressor;
   wherein said heat exchanger is positioned in a bypass duct, and a fan delivering air into said bypass duct and into said main compressor section, and said turbine section is connected to drive said fan through a gear reduction;
   wherein at lower power operation of the gas turbine engine said check valve blocking flow, and said dump valve dumping air downstream of said cooling compressor, and at higher power operation of said gas turbine engine said check valve allowing flow downstream of said cooling compressor to reach said at least one rotatable component, and said dump valve not dumping air downstream of said cooling compressor;
   wherein said higher power operation including take-off of an aircraft associated with said gas turbine engine, and said lower power operation including at least idle of said gas turbine engine; and
   said at least one of said rotatable components being in said turbine section, and said dump valve acting to dump air downstream of said cooling compressor, but upstream of said turbine section such that air dumped by said dump valve does not reach said at least one of said rotatable components in said turbine section.

10. The gas turbine engine as set forth in claim 9, wherein a second tap is located downstream of said upstream location, and is connected to selectively deliver air to cool said at least one of said rotatable components at least when said check valve blocks flow downstream of said cooling compressor.

11. The gas turbine engine as set forth in claim 10, wherein said dump valve and said check valve move as a single valve.

12. The gas turbine engine as set forth in claim 11, wherein said check valve is driven by a pressure downstream of said cooling compressor to allow flow to reach said at least one of said rotatable components when a pressure downstream of said cooling compressor is above a predetermined limit greater than the pressure at the second tap location, and block flow when said pressure downstream of said cooling compressor is below said predetermined limit, and said check valve being connected to said dump valve which selectively opens or blocks communication to dump said air.

* * * * *